United States Patent
Kim et al.

(10) Patent No.: US 12,335,027 B2
(45) Date of Patent: Jun. 17, 2025

(54) METHOD FOR PROVIDING BROADCAST SIGNAL FREQUENCY AND SYSTEM FOR PROVIDING THE SAME

(71) Applicants: HYUNDAI MOTOR COMPANY, Seoul (KR); Kia Corporation, Seoul (KR)

(72) Inventors: Yoonsoo Kim, Seoul (KR); Sang Heun Lee, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 466 days.

(21) Appl. No.: 17/673,412

(22) Filed: Feb. 16, 2022

(65) Prior Publication Data

US 2022/0416923 A1 Dec. 29, 2022

(30) Foreign Application Priority Data

Jun. 24, 2021 (KR) ........................ 10-2021-0082588

(51) Int. Cl.
| | | |
|---|---|---|
| *H04H 20/62* | (2008.01) | |
| *H04H 20/48* | (2008.01) | |
| *H04H 60/53* | (2008.01) | |
| *H04H 60/61* | (2008.01) | |
| *H04H 60/70* | (2008.01) | |
| *H04W 4/029* | (2018.01) | |
| *H04W 4/44* | (2018.01) | |

(52) U.S. Cl.
CPC ............ *H04H 20/62* (2013.01); *H04H 60/53* (2013.01); *H04H 60/61* (2013.01); *H04H 60/70* (2013.01); *H04W 4/029* (2018.02); *H04W 4/44* (2018.02); *H04H 20/48* (2013.01)

(58) Field of Classification Search
CPC ........ H04H 20/62; H04H 60/53; H04H 60/61; H04H 60/70; H04H 20/48; H04H 60/51; H04H 20/22; H04H 60/52; H04H 60/78; H04H 60/42; H04H 20/57; H04H 20/20; H04H 20/26; H04H 20/24; H04W 4/029; H04W 4/44; H04W 76/40; H04W 4/02; H04W 4/46; H04W 72/0473; H04N 21/4383; H04N 21/41422; H04N 21/4524
See application file for complete search history.

(56) References Cited

U.S. PATENT DOCUMENTS

| | | | | |
|---|---|---|---|---|
| 7,269,151 B2 * | 9/2007 | Diener | .................. | H04L 1/1664 370/329 |
| 9,125,019 B1 * | 9/2015 | Heikkila | .............. | G01S 5/0295 |
| 10,243,604 B2 * | 3/2019 | Ross | .................... | H04B 1/3822 |

(Continued)

*Primary Examiner* — Jinsong Hu
*Assistant Examiner* — Rui M Hu
(74) *Attorney, Agent, or Firm* — Morgan, Lewis & Bockius LLP (57) ABSTRACT

A method for providing a broadcast signal frequency capable of determining an optimal broadcast signal frequency at an accurate location includes collecting vehicle data including location information and information related to a broadcasting function from a plurality of vehicles, determining, based on the vehicle data, a first frequency for receiving a first broadcasting channel with highest reception quality in a first location and a second frequency for receiving the first broadcasting channel with highest reception quality in a second location, and transmitting information on the first frequency and the second frequency to a first vehicle.

12 Claims, 8 Drawing Sheets

(56) References Cited

U.S. PATENT DOCUMENTS

| | | | | |
|---|---|---|---|---|
| 10,299,106 B1* | 5/2019 | Cooper | ............ | H04H 60/51 |
| 10,708,887 B1* | 7/2020 | Evans | ............ | H04W 72/02 |
| 2008/0248822 A1* | 10/2008 | Jarvinen | ............ | H04W 4/02 |
| | | | | 455/67.11 |
| 2008/0311940 A1* | 12/2008 | Uppala | ............ | H04H 20/22 |
| | | | | 455/509 |
| 2009/0313008 A1* | 12/2009 | Okada | ............ | H04N 5/44 |
| | | | | 704/10 |
| 2010/0323694 A1* | 12/2010 | Altintas | ............ | H04W 16/14 |
| | | | | 455/434 |
| 2014/0073337 A1* | 3/2014 | Hong | ............ | H04W 72/046 |
| | | | | 455/452.1 |
| 2015/0117248 A1* | 4/2015 | Garcia | ............ | H04B 17/309 |
| | | | | 370/252 |
| 2015/0181374 A1* | 6/2015 | Tsuda | ............ | H04W 4/02 |
| | | | | 455/457 |
| 2017/0164423 A1* | 6/2017 | Ross | ............ | H04B 1/3822 |
| 2017/0325210 A1* | 11/2017 | Green | ............ | H04W 72/51 |
| 2018/0167789 A1* | 6/2018 | Tsuchida | ............ | G08G 1/13 |
| 2018/0248613 A1* | 8/2018 | Peitzer | ............ | H04B 17/12 |
| 2020/0404623 A1* | 12/2020 | Evans | ............ | H04W 4/70 |
| 2021/0076236 A1* | 3/2021 | Kimura | ............ | H04W 16/18 |
| 2023/0208541 A1* | 6/2023 | Su | ............ | H04H 60/42 |
| | | | | 455/3.06 |
| 2023/0421224 A1* | 12/2023 | Lee | ............ | H04B 7/0632 |

* cited by examiner

METHOD FOR PROVIDING BROADCAST SIGNAL FREQUENCY AND SYSTEM FOR PROVIDING THE SAME

CROSS-REFERENCE TO RELATED APPLICATION(S)

This application is based on and claims the benefit of priority to Korean Patent Application No. 10-2021-0082588, filed on Jun. 24, 2021 in the Korean Intellectual Property Office, the disclosure of which is incorporated by reference herein in its entirety.

BACKGROUND

1. Technical Field

The present disclosure relates to a method for providing an optimal broadcast signal frequency to a vehicle and a system for providing the same.

2. Description of the Related Art

A broadcast receiver is installed in a vehicle, and a user of the vehicle may listen to a desired broadcasting (e.g., radio broadcast) through the broadcast receiver.

In order to select a desired broadcasting channel, the user manually selects a broadcast signal frequency matching the broadcasting channel.

On the other hand, because a different broadcasting frequency is transmitted depending on a location of a transmitting base station even on the same broadcasting channel, an optimal frequency for receiving a specific broadcasting channel is changed as the location of the vehicle changes.

Accordingly, the user needs to manually change the broadcast signal frequency while driving in order to continuously listen to the desired broadcasting channel, which may cause a safety accident.

SUMMARY

According to various aspects of the present disclosure, a method and a system capable of determining an optimal broadcast signal frequency depending on a location of a vehicle using big data and providing the optimal broadcast signal frequency for receiving a specific broadcasting channel to the vehicle are provided.

Additional aspects of the present disclosure will be set forth in part in the description which follows and, in part, will be obvious from the description, or may be learned by practice of the disclosure.

In accordance with an aspect of the present disclosure, a method for providing a broadcast signal frequency includes collecting vehicle data including location information and information related to a broadcasting function from a plurality of vehicles, determining, based on the vehicle data, a first frequency for receiving a first broadcasting channel with highest reception quality in a first location and a second frequency for receiving the first broadcasting channel with highest reception quality in a second location, and transmitting information on the first frequency and the second frequency to a first vehicle.

The information related to the broadcasting function may include broadcasting channel information, frequency information, and reception quality information.

The location information may include latitude information and longitude information.

The method may further include processing the vehicle data collected from the plurality of vehicles.

The processing of the vehicle data collected from the plurality of vehicles may include accumulating and averaging the vehicle data collected from the plurality of vehicles for a preset period.

The determining of the first frequency and the second frequency based on the vehicle data may include determining the first frequency and the second frequency based on the accumulated and averaged vehicle data.

The transmitting of the information on the first frequency and the second frequency to the first vehicle may include receiving destination information from the first vehicle, setting a route based on the destination information, determining a change section in which a location of the first vehicle is changed from the first location to the second location on the set route, and transmitting information on the set route and information on the change section to the first vehicle.

The information on the change section may include location information of the change section and the information on the second frequency.

The method may further include automatically changing a frequency of a broadcast receiver of the first vehicle based on the information on the first frequency and the second frequency.

The automatically changing of the frequency of the broadcast receiver of the first vehicle may include changing the frequency of the broadcast receiver to the first frequency when the first vehicle drives in the first location, and changing the frequency of the broadcast receiver to the second frequency when the first vehicle drives in the second location.

In accordance with an aspect of the present disclosure; a system for providing a broadcast signal frequency includes a communicator provided to receive vehicle data including location information and information related to a broadcasting function from a plurality of vehicles, a storage device provided to store the vehicle data, and at least one processor provided to determine, based on the vehicle data, a first frequency for receiving a first broadcasting channel with highest reception quality in a first location and a second frequency for receiving the first broadcasting channel with highest reception quality in a second location and control the communicator to transmit information on the first frequency and the second frequency to a first vehicle.

The information related to the broadcasting function may include broadcasting channel information, frequency information, and reception quality information.

The location information may include latitude information and longitude information.

The storage device may process the vehicle data collected from the plurality of vehicles.

The storage device may accumulate and average the vehicle data collected from the plurality of vehicles for a preset period.

The at least one processor may determine the first frequency and the second frequency based on the accumulated and averaged vehicle data.

The at least one processor may receive destination information from the first vehicle through the communicator, set a route based on the destination information, determine a change section in which a location of the first vehicle is changed from the first location to the second location on the set route, and control the communicator to transmit information on the set route and information on the change section to the first vehicle.

The information on the change section may include location information of the change section and the information on the second frequency.

The at least one processor may control the communicator to transmit a control command for changing a frequency of a broadcast receiver in the change section to the first vehicle.

The at least one processor may control the communicator to transmit the information on the first frequency to the first vehicle in response to the first vehicle being driven at the first location, and control the communicator to transmit the information on the second frequency to the first vehicle in response to the first vehicle being driven at the second location.

BRIEF DESCRIPTION OF THE DRAWINGS

These and/or other aspects of the present disclosure will become apparent and more readily appreciated from the following description of the embodiments, taken in conjunction with the accompanying drawings of which.

DETAILED DESCRIPTION

Advantages and features of the disclosure, as well as a method and devices for achieving them, will be made clear by the embodiments described below with reference to the accompanying drawings. However, the disclosure is not limited to the embodiments disclosed below and may be implemented in various different forms, only the disclosed embodiments are provided such that the disclosure of the invention is complete, and to fully inform those of ordinary skill in the art to which the disclosure belongs, the scope of the invention, and the disclosure is only defined by the scope of the claims.

Terms used in the disclosed specification will be briefly described, and the disclosure will be described in detail.

In the disclosed specification, general terms currently widely used as possible are selected while considering the functions in the disclosure, but these terms may vary depending on the intention or precedent of a person skilled in the art, the emergence of new technology, and the like. In addition, in a specific case, there may be a term arbitrarily selected by the applicant, and in this case, the meaning will be described in detail in the corresponding description of the disclosure. Therefore, the terms used in the disclosure should be defined based on the meaning of the terms and the overall content of the disclosure, not just the names of the terms.

Throughout the specification, when it is described that a part "includes" an element, it means that the element may further include other elements, not excluding the other elements unless specifically stated otherwise. The term 'part' used in this specification may be implemented as software or hardware such as FPGA and ASIC, and the term 'part' perform certain functions. However, the 'part' is not limited to software or hardware. The 'part' may be configured to be provided on an addressable storage medium or configured to reproduce one or more processors. Thus, as an example, the 'part' includes components such as software components, object-oriented software components, class components and task components, processes, functions, properties, procedures, subroutines, segments of program code, drivers, firmware, microcode, circuits, data, databases, data structures, tables, arrays and variables. The functionality provided within the components and 'parts' may be combined into a smaller number of components and 'parts' or further divided into additional components and 'parts'.

An identification numeral designated to each step is used for convenience of explanation, the identification numeral does not describe the order of the steps, and each step may be performed differently from the order specified unless the context clearly states a particular order.

Hereinafter, embodiments of a method and a system for providing a broadcast signal frequency will be described in detail with reference to the accompanying drawings so that a person skilled in the art to which the disclosure belongs may easily implement the embodiments. In order to clearly explain the disclosure, parts not related to the explanation will be omitted from the drawings. Also, in the drawings, the same reference numerals denote the same components, and overlapping descriptions thereof will be omitted.

Figure 1:
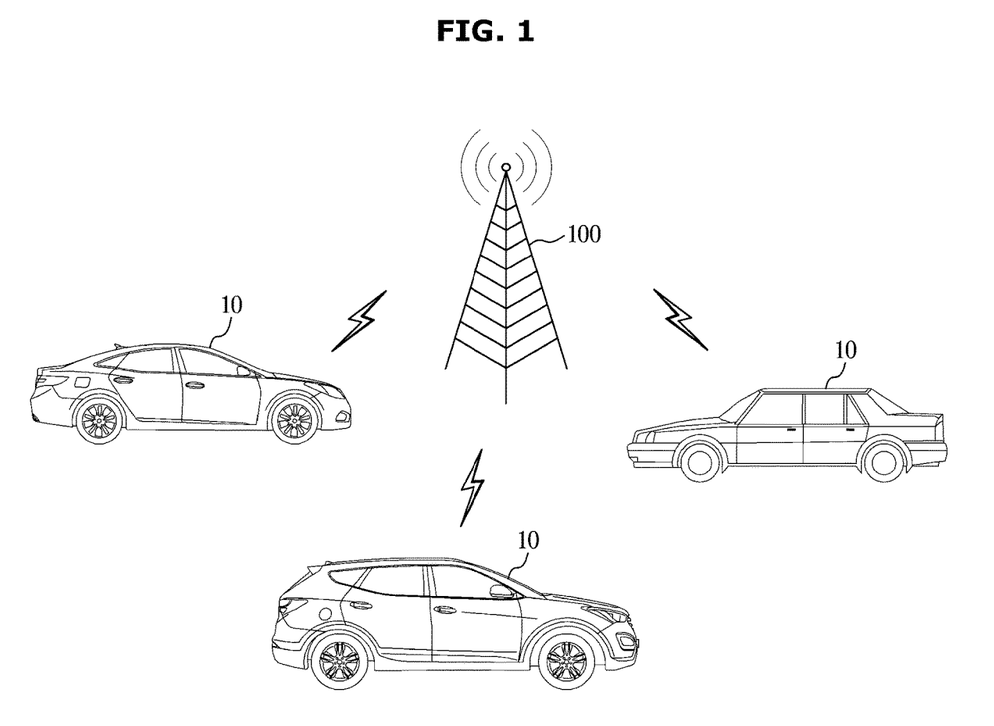
FIG. 1 illustrates a vehicle and a system according to an embodiment.
Figure 2:
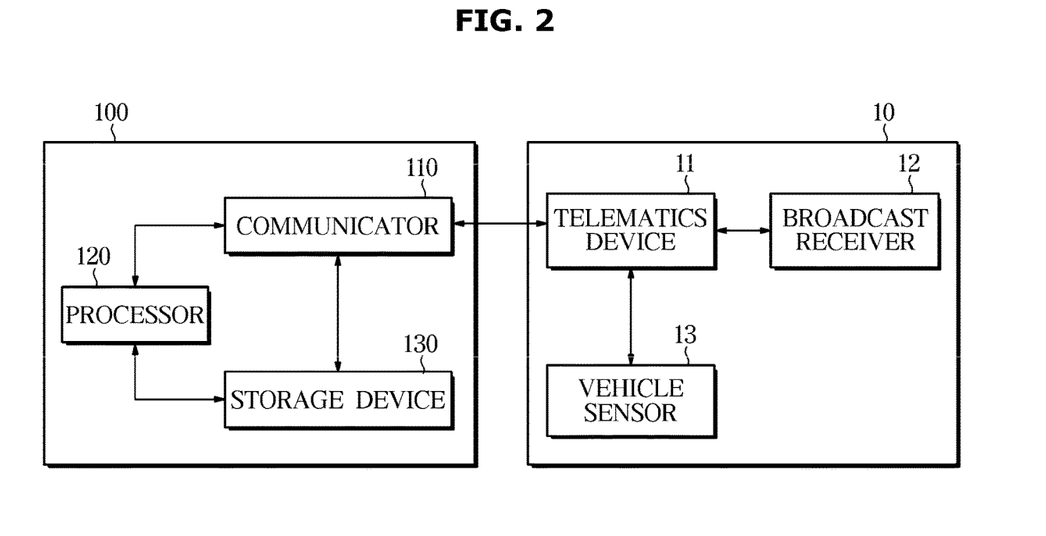
FIG. 2 is a control block diagram of the vehicle and the system according to an embodiment.

FIG. 1 illustrates a vehicle and a system according to an embodiment, and FIG. 2 is a control block diagram of the vehicle and the system according to an embodiment.

Referring to FIGS. 1 and 2, a plurality of vehicles 10 may exchange various types of information and data with a system 100.

The system 100 according to an embodiment may include a communicator 110, a processor 120, and a storage device 130, and the plurality of vehicles 10 according to an embodiment may include a telematics device 11, a broadcast receiver 12, and a vehicle sensor 13.

The system 100 according to an embodiment may refer to at least one server (e.g., a computer device).

The telematics device 11 according to an embodiment may establish a wireless communication channel between external electronic devices (e.g., the system 100 and a user terminal) and perform communication through the established communication channel. Accordingly, the telematics device 11 may communicate with the external system 100 to transmit various data and/or information and/or commands to the external system 100, and may receive various data and/or information and/or commands from the external system 100.

The telematics device 11 may be implemented using a communication chip, an antenna, and related components to be connectable to a wireless communication network. That is, the telematics device 11 may be implemented as various types of communication modules capable of long-distance communication with the external system 100.

According to various embodiments, the telematics device 11 may further include a communication circuit (also referred to as a transceiver) capable of performing communication between components of the vehicle 10 through a vehicle communication network, for example, CAN (controller area network) communication and/or LIN (local interconnect network) communication, and a control circuit for controlling an operation of the communication circuit.

According to an embodiment, the communicator 110 may establish a wireless communication channel between external electronic devices (e.g., the telematics device 11 of the vehicle 10) and perform communication through the established communication channel. Accordingly, the communicator 110 may communicate with the vehicle 10 to transmit various data and/or information and/or commands to the vehicle 10, and may receive various data and/or information and/or commands from the vehicle 10.

According to various embodiments, the communicator 110 may be implemented using a communication chip, an antenna, and related components to be connectable to the wireless communication network. That is, the communicator 110 may be implemented as various types of communication modules capable of long-distance communication with the external system 100.

For example, the telematics device 11 and the communicator 110 may include a communication module including one or more communication processors 120 supporting wireless communication, and the communication modules may communicate with each other via a long-distance telecommunication network (e.g., legacy cellular network, 5G network, next-generation telecommunications network, Internet, or computer network (e.g., LAN or WAN)).

The system 100 according to an embodiment may include the at least one processor 120 provided to execute a program performing an operation which will be described later.

The storage device 130 according to an embodiment may include at least one memory for storing a program performing an operation which will be described later and at least one memory for storing various data (e.g., vehicle data). The at least one memory may include a volatile memory or a non-volatile memory. According to an embodiment, the storage device 130 may include at least one processor for processing received data.

According to various embodiments, the telematics device 11 may include an input device (e.g., a touchpad, various buttons, or a microphone) for receiving a user input and a display device for displaying various types of information.

For example, when the telematics device 11 has a navigation function, the telematics device 11 may receive the user input setting a destination through the input device and provide a setting route to a user through the display device.

The telematics device 11 may include at least one memory for storing a program performing the operation described above and an operation which will be described later and at least one processor for executing the program.

The broadcast receiver 12 according to an embodiment may receive a broadcast signal transmitted from a transmitting station of a broadcasting company (e.g., a radio broadcasting company), and may include a display function and/or an audio function of reproducing a sound source and/or an image corresponding to the broadcast signal.

For this purpose, the broadcast receiver 12 may include at least one antenna, a main tuner and/or a sub-tuner electrically connected to the at least one antenna, a signal processing processor, and a control circuit for controlling various components of the broadcast receiver 12.

The main tuner and the sub-tuner of the broadcast receiver 12 may receive a signal of a broadcasting frequency (e.g., a radio frequency) corresponding to the selected broadcasting channel.

The sub-tuner of the broadcast receiver 12 may identify at least one broadcasting frequency configurable in the broadcast receiver 12, that is, an effective broadcasting frequency, based on an electric field strength of signals of all frequencies received via at least one antenna. For example, the sub-tuner may identify a broadcasting frequency of a signal having an electric field strength greater than a predetermined reference electric field strength as a valid broadcasting frequency.

The signal processing processor of the broadcast receiver 12 may transmit a signal of a broadcasting frequency received from the main tuner to a speaker and/or a display device of the vehicle 10 (e.g., the display device of the telematics device 11) so that the speaker and/or the display device outputs the signal.

The signal processing processor of the broadcast receiver 12 may include at least one digital signal processor electrically connected to the main tuner and the sub-tuner, an audio correlator and/or an audio DSP.

A signal received from the at least one digital signal processor, the main tuner, and the sub-tuner may be processed and transmitted to the audio correlator and/or the audio DSP.

The audio correlator may obtain correlation information by identifying a correlation between signals transmitted from the plurality of digital signal processors, and the control circuit may change the broadcasting frequency by using the correlation information.

The telematics device 11 may display a set frequency of the broadcast receiver 12 and/or information of a broadcasting channel corresponding to the set frequency through the display device, and the user may manually change the broadcasting frequency through the telematics device 11.

The vehicle sensor 13 may include various sensors capable of collecting various types of information related to the vehicle 10. For example, the vehicle sensor 13 may include a global positioning system (GPS) sensor, and the GPS sensor may obtain information on the current location of the vehicle 10.

The vehicle sensor 13 may transmit the collected information (e.g., location information) to various components (e.g., the telematics device 11) of the vehicle 10 through the vehicle communication network, or may transmit the collected information (e.g., location information) to an external server (e.g., the system 100) through direct communication.

Although this embodiment describes each component as a separate component from each other with reference to FIG. 2, each component may be a physically distinct separate component, or may be an element of one physically indistinguishable component.

For example, in the system 100, the at least one processor 120 may include a communication processor of the communicator 110 and a processor of the storage device 130.

As another example, in the vehicle 10, the telematics device 11 and the broadcast receiver 12 may be implemented as one component.

In the above, the components of the vehicle 10 and the components of the system 100 for providing a broadcast signal frequency have been described.

Figure 3:
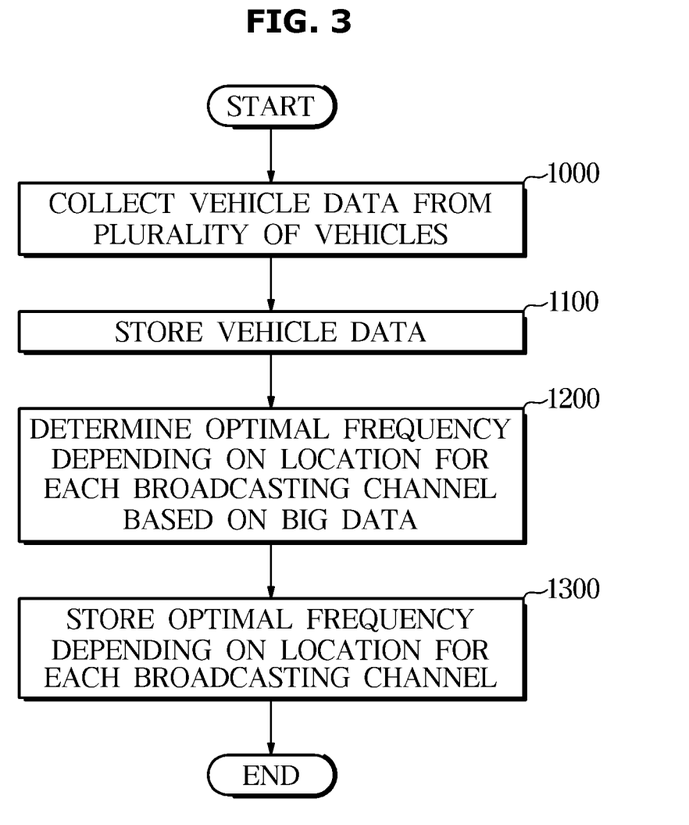
FIG. 3 is a flowchart of a method for providing a broadcast signal frequency.
Figure 4:
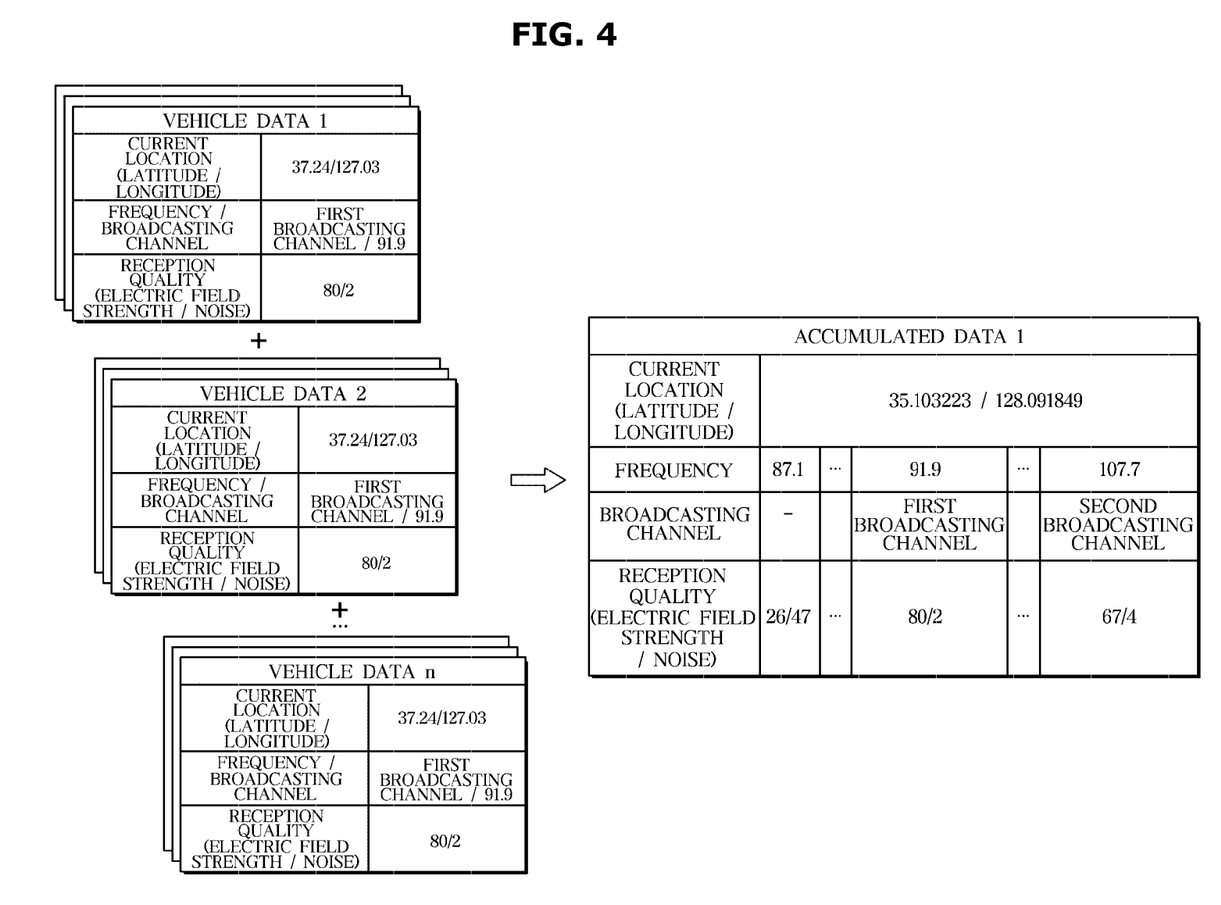
FIG. 4 is a diagram for explaining a process of processing and storing vehicle data.
Figure 5:
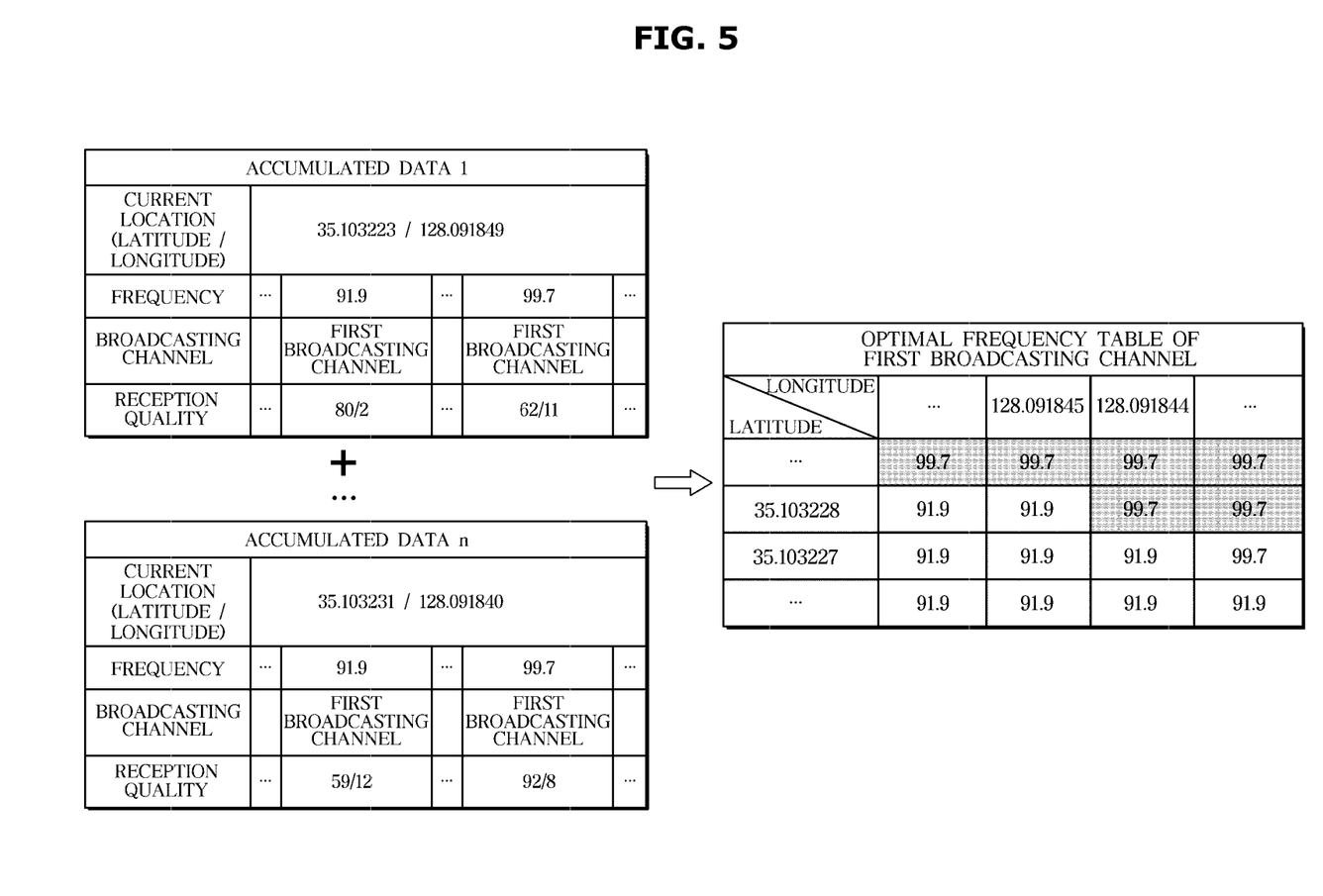
FIGS. 5 and 6 are diagrams for explaining a process of determining and storing an optimal frequency.
Figure 6:
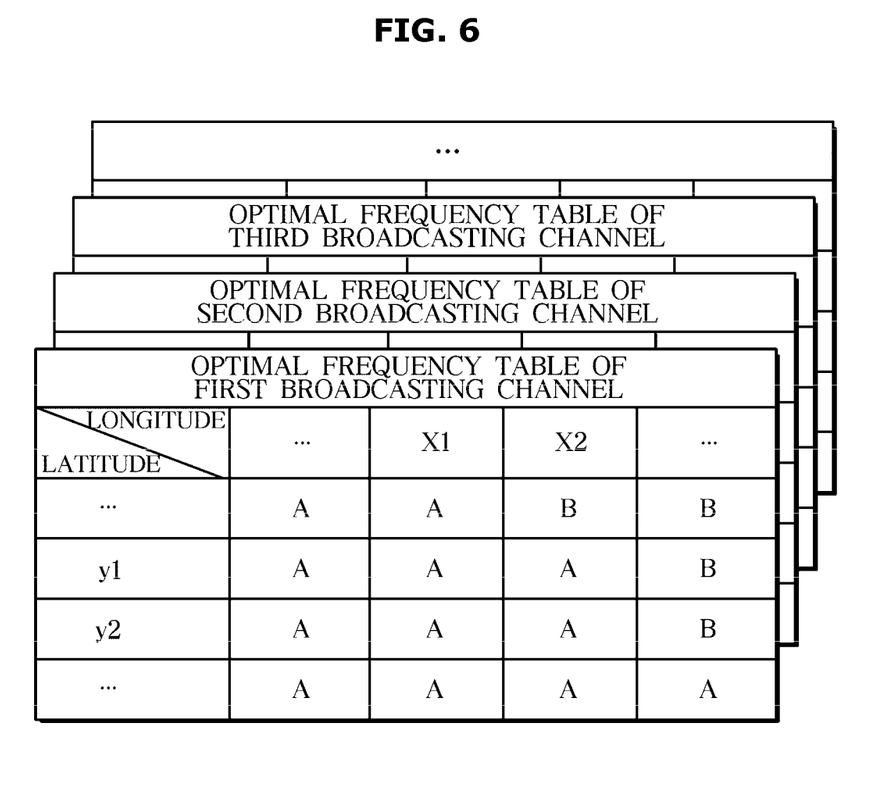

FIG. 3 is a flowchart of a method for providing a broadcast signal frequency, FIG. 4 is a diagram for explaining a process of processing and storing vehicle data, and FIGS. 5 and 6 are diagrams for explaining a process of determining and storing an optimal frequency.

Referring to FIG. 3, the system 100 according to an embodiment may collect vehicle data from the plurality of vehicles 10 (1000).

In an embodiment, the communicator 110 may receive vehicle data including location information and information related to a broadcasting function from a communicator (e.g., the telematics device 11) provided in the plurality of vehicles 10.

The vehicle data transmitted from the plurality of vehicles 10 may include location information of the vehicle 10 and information related to a broadcasting function.

The location information of the vehicle 10 may be obtained from the GPS sensor of the vehicle 10 and may include latitude information and longitude information.

The information related to the broadcasting function may include, for example, broadcasting channel information, frequency information, and reception quality information.

The frequency information may include information on a broadcasting frequency set through the broadcast receiver 12 of the vehicle 10, the broadcasting channel information may include a broadcasting name of a broadcasting channel corresponding to the broadcasting frequency set in the vehicle 10, and the reception quality information may include information on an electric field strength and noise of a signal of a broadcasting frequency calculated through the broadcast receiver 12 of the vehicle 10.

In other words, the system 100 may obtain, from each of the plurality of vehicles 10, the set broadcasting frequency, a broadcasting channel corresponding to the set broadcasting frequency, and information on the broadcasting reception quality of the broadcast receiver 12.

Referring to FIG. 4, vehicle data 1, vehicle data 2, . . . vehicle data n may refer to vehicle data received from different vehicles 10, respectively.

The storage device 130 may store the vehicle data (vehicle data 1, vehicle data 2, . . . vehicle data n) collected from the plurality of vehicles 10 (1100).

According to various embodiments, the storage device 130 may process and store the vehicle data (vehicle data 1, vehicle data 2, . . . vehicle data n) collected from the plurality of vehicles 10.

For example, the storage device 130 may accumulate and average the vehicle data (vehicle data 1, vehicle data 2, . . . vehicle data n) collected from the plurality of vehicles 10 for a preset period, and may compress and store the accumulated and averaged data as single data.

The preset period may be varied in consideration of an amount of vehicle data collected from the plurality of vehicles 10 and an opportunity cost of freshness of the data.

According to an embodiment, the storage device 130 may classify the vehicle data (vehicle data 1, vehicle data 2, . . . vehicle data n) collected from the plurality of vehicles 10 depending on a location or a broadcasting channel, and then may accumulate and average a set frequency for receiving the same channel at the same location and the broadcasting reception quality depending on the set frequency.

By referring to the accumulated data, the reception quality in the case of receiving a specific broadcasting channel using a specific frequency at the same location may be confirmed.

As such, the system 100 may convert the vehicle data (vehicle data 1, vehicle data 2, . . . vehicle data n) collected from the plurality of vehicles 10 into big data and store the big data in the storage device 130.

The at least one processor 120 may determine an optimal frequency depending on a location for each broadcasting channel based on the vehicle data (vehicle data 1, vehicle data 2, . . . vehicle data n) collected from the plurality of vehicles 10 stored in the storage device 130 (1200).

According to various embodiments, at least one processor 120 may determine an optimal frequency depending on a location for each broadcasting channel based on a set of data (hereinafter 'accumulated data') in which the vehicle data (vehicle data 1, vehicle data 2, . . . vehicle data n) collected from the plurality of vehicles 10 stored in the storage device 130 are processed and stored (hereinafter 'big data').

Referring to FIG. 5, the at least one processor 120 may determine an optimal frequency for receiving a first broadcasting channel depending on a location based on a plurality of accumulated data (accumulated data 1, . . . accumulated data n) classified into the first broadcasting channel.

According to various embodiments, the storage device 130 may store an optimal frequency table for receiving the first broadcasting channel.

The optimal frequency for receiving the first broadcasting channel may be different depending on latitude and longitude.

In an embodiment, the at least one processor 120 may determine, as an optimal frequency, a frequency classified as having the highest reception quality for the first broadcasting channel for a specific location, that is, having the largest electric field strength value versus noise value.

For example, the optimal frequency for receiving the first broadcasting channel at a first location (e.g., latitude 35.103228/longitude 128.091845) may be determined to be 91.9 (MHz), and the optimal frequency for receiving the first broadcasting channel at a second location (e.g., latitude 35.103228/longitude 128.091844) may be determined to be 99.7 (MHz).

In other words, the at least one processor 120 may determine, based on the vehicle data collected from the plurality of vehicles 10, a first frequency for receiving the first broadcasting channel with the highest reception quality at the first location, and may determine a second frequency for receiving the first broadcasting channel with the highest reception quality at the second location.

The storage device 130 may store an optimal frequency table depending on a location for each broadcasting channel (1300).

Referring to FIG. 6, the storage device 130 may store an optimal frequency table depending on a location for each of a plurality of the broadcasting channels (e.g., first broadcasting channel, second broadcasting channel, third broadcasting channel, . . . ) using the big data.

A form/format of the data described through FIGS. 4 to 6 is provided to help the understanding of the description, and the form/format of the data may be employed without limitation within the scope of ordinary technology.

The system 100 according to an embodiment may provide useful information for user convenience by collecting vehicle data from the plurality of vehicles 10 in real time and processing the collected vehicle data to obtain useful data.

Hereinafter, an embodiment in which the system 100 provides optimal frequency information depending on a location for each broadcasting channel to the vehicle 10 and the vehicle 10 changes the frequency of the broadcast receiver 12 without user intervention will be described.

According to various embodiments, the system 100 may deliver information on an optimal frequency for each location for receiving a specific broadcasting channel with the highest quality to the vehicle 10.

For example, the system 100 may transmit information on the first frequency for receiving the first broadcasting channel with the highest reception quality at the first location, and information on the second frequency for receiving the first broadcasting channel with the highest reception quality at the second location, to the first vehicle 10.

For example, the at least one processor 120 may control the communicator 110 to transmit information on the first frequency and information on the second frequency to the first vehicle 10.

In this case, the first vehicle 10 may be a vehicle with a history of receiving the first broadcasting channel, a vehicle currently receiving the first broadcasting channel, or a vehicle in which the first broadcasting channel is registered as a favorite.

For convenience of explanation, locations having different latitudes or longitudes are classified into the first location and the second location, and in addition to information on the first frequency or the second frequency, the system 100 may transmit information on a frequency (e.g., a third frequency, a fourth frequency, . . . a Nth frequency) for receiving the first broadcasting channel with the highest quality in another location (e.g., a third location, a fourth location, . . . a Nth location), to the first vehicle 10.

Figure 7:
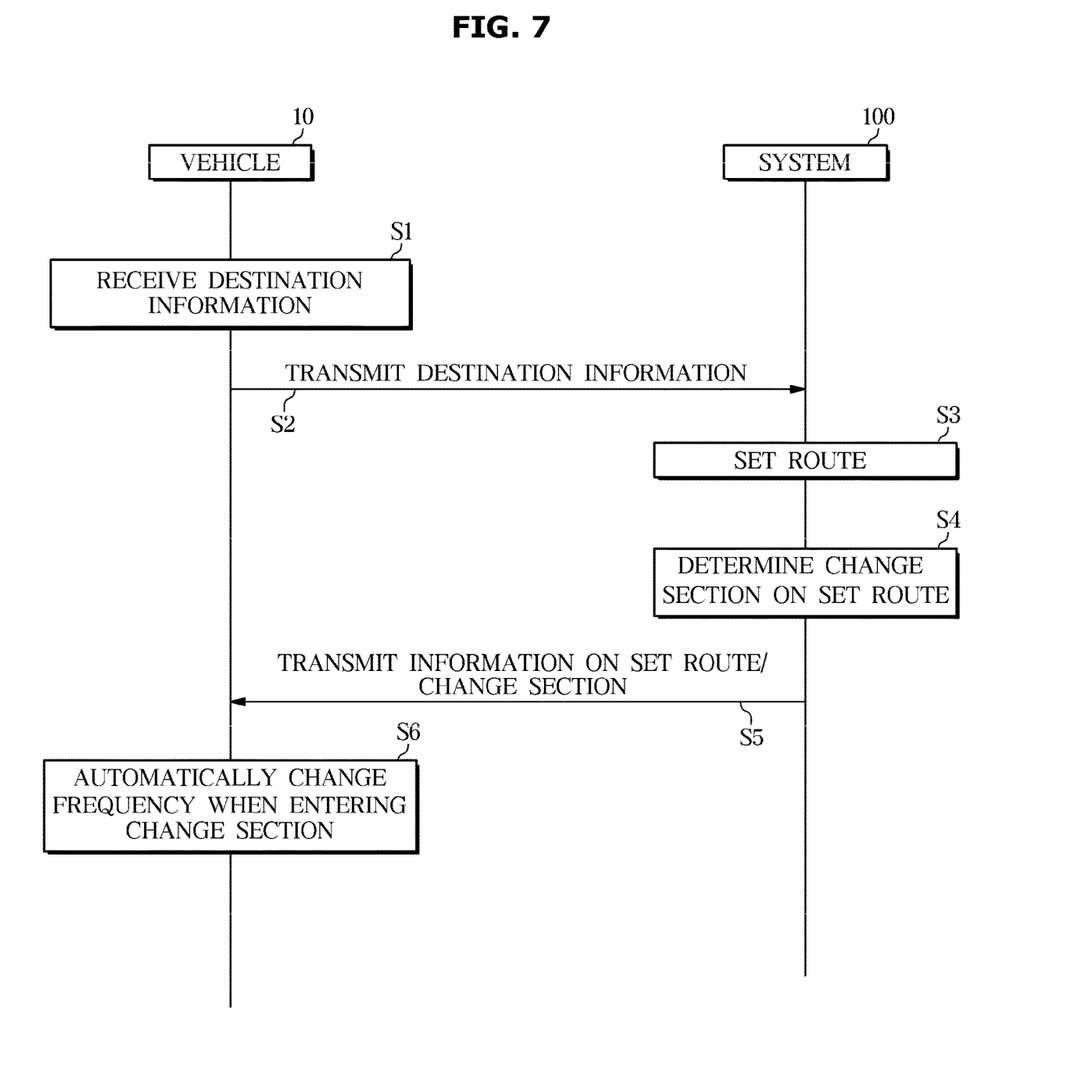
FIG. 7 is a flowchart of a method for the vehicle to automatically change the broadcast signal frequency.
Figure 8:
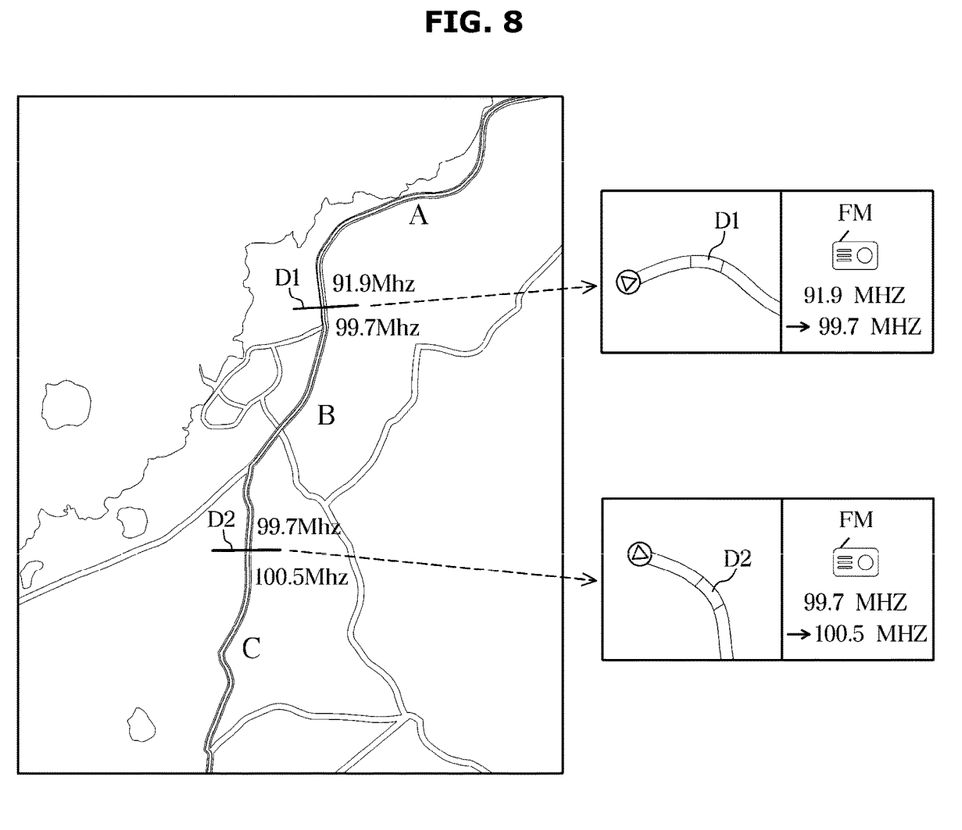
FIG. 8 is a diagram for explaining a process in which the broadcast signal frequency is automatically changed in a change section.

FIG. 7 is a flowchart of a method for the vehicle to automatically change the broadcast signal frequency, and FIG. 8 is a diagram for explaining a process in which the broadcast signal frequency is automatically changed in a change section.

Referring to FIG. 7, the vehicle 10 according to an exemplary embodiment may receive destination information from the user. For example, the user may set a destination through an input device included in a device including the navigation function (e.g., the telematics device 11 or a separate navigation device), and the vehicle 10 may receive information on the destination set by the user (S1). The destination information may include all information capable of specifying the destination, such as a name and an address of the destination.

The telematics device 11 of the vehicle 10 may transmit the destination information set by the user and the location information of the vehicle 10 to the system 100 (S2).

The system 100 may set at least one route for reaching the destination from the current location of the vehicle 10 in consideration of various external factors (e.g., road traffic situation, weather, road type) (S3).

Specifically, the at least one processor 120 may set at least one route for reaching the destination from the current location of the vehicle 10 based on the external information obtained through the communicator 110, the location information of the vehicle 10, and the destination information.

According to various embodiments, the system 100 may set various routes, such as a first route to reach the destination with a minimum distance, a second route to reach the destination with the least amount of time, and a third route to reach the destination with a minimal toll.

The system 100 may determine a change section in which the location of the vehicle 10 is changed from the first location to the second location on the set route (S4).

In this case, the first location and the second location may refer to two different points on the set route and where a difference between the optimal frequency values for receiving the first broadcasting channel is greater than a preset value.

In other words, when a difference between a first optimal frequency for receiving the first broadcasting channel at the first location and a second optimal frequency for receiving the first broadcasting channel at the second location is greater than the preset frequency, the system 100 may determine a section in which the location of the vehicle 10 is changed from the first location to the second location as the change section.

According to various embodiments, the preset frequency may be set in consideration of noise due to frequent frequency change and opportunity cost of quality improvement due to frequency change.

The system 100 may transmit information on the set route and information on the change section to the vehicle 10 (S5).

Specifically, the at least one processor 120 may control the communicator 110 to transmit information on the set route and information on the change section to the vehicle 10.

In this case, the information on the change section may include location information of the change section and frequency information (e.g., information on the second frequency) to be changed in the change section.

When the vehicle 10, which has received the information on the set route and the information on the change section, enters the change section, the vehicle 10 may automatically change the frequency of the broadcast receiver 12 without user intervention.

In an embodiment, the control circuit of the broadcast receiver 12 may automatically change the set frequency when the vehicle 10 enters the change section.

Referring to FIG. 8, the optimal frequency may be different depending on a plurality of points on a driving path, but for convenience of explanation, it is assumed that the optimal frequency for receiving the first broadcasting channel in a path A is 91.9 (MHz), the optimal frequency for receiving the first broadcasting channel in a path B is 99.7 (MHz), and the optimal frequency for receiving the first broadcasting channel in a path C is 100.5 (MHz).

The vehicle 10 may receive, from the system 100, information on a first change section D1 that is changed from the first location (e.g., path A) to the second location (e.g., path B) on the set path and information on the second frequency (99.7 MHz), as well as a set path.

Also, the vehicle 10 may receive information on a second change section D2 that is changed from the second location (e.g., path B) to the third location (e.g., path C) on the set path and information on the third frequency (100.5 MHz).

When the vehicle 10 passes through the second change section D2, the vehicle 10 may control the broadcast receiver 12 to change the set frequency set to 99.7 MHz to 100.5 MHz.

According to various embodiments, the at least one processor 120 may also control the communicator 110 to transmit a control command for changing the frequency of the broadcast receiver 12 to the vehicle 10 in the change section. That is, the system 100 may directly change the set frequency of the broadcast receiver 12.

When the frequency is automatically changed, the vehicle 10 may notify the user through the display device and/or the speaker that the set frequency of the broadcast receiver 12 is automatically changed.

As such, the vehicle 10 according to an embodiment automatically changes the set frequency of the broadcast receiver 12 in the change section on the set path based on the information received through the system 100, thereby improving user convenience.

According to various embodiments, the at least one processor 120 may control the communicator 110 to transmit information on the first frequency to the first vehicle 10 in response to the first vehicle 10 being driven at the first location, and may control the communicator 110 to transmit information on the second frequency to the first vehicle 10 in response to the first vehicle 10 being driven at the second location That is, the system 100 may also provide information on an optimal frequency for receiving a specific broadcasting channel at the current location of the vehicle 10 in real time.

Depending on the method and system 100 for providing a broadcast signal frequency according to an embodiment, by using big data, the optimal frequency for receiving a specific broadcasting channel may be determined depending on the exact location.

Rather than transmitting the optimal frequency information at all locations, by matching with the set path of the vehicle 10 and transmitting only information on the frequency change section, unnecessary information exchange between the system 100 and the vehicle 10 may be prevented.

An example of a method and system for providing a broadcast signal frequency is not limited thereto, and the embodiments described above are exemplary in all respects. Therefore, a person having ordinary skill in the technical field to which the disclosure belongs will be able to understand that the disclosure may be implemented in other specific forms without changing the technical idea or essential characteristics thereof. The scope of the disclosure is set forth in the claims rather than in the foregoing description, and all differences within the scope equivalent thereto should be construed as included in the disclosure.

Herein, the disclosed embodiments may be implemented in the form of a recording medium storing instructions executable by a computer. The instructions may be stored in the form of program code, and when executed by a processor, a program module may be created to perform the operations of the disclosed embodiments. The recording medium may be implemented as a computer-readable recording medium.

The computer-readable recording medium includes various kinds of recording media in which instructions which may be decrypted by a computer are stored. For example, there may be a read only memory (ROM), a random access memory (RAM), a magnetic tape, a magnetic disk, a flash memory, an optical data storage device, and the like.

As is apparent from the above, according to various embodiments of the present disclosure, a safety accident that may occur as a user manually changes a broadcast signal frequency while driving can be prevented in advance.

Further, the present disclosure can determine an optimal broadcast signal frequency at an accurate location by using big data, and thus can provide an optimal broadcasting quality to the user.

What is claimed is:

1. A method for providing a broadcast signal frequency, comprising:
    collecting vehicle data including location information and information related to a broadcasting function from a plurality of vehicles;
    determining, based on the vehicle data, a first frequency for receiving a first broadcasting channel with highest reception quality in a first location and a second frequency for receiving the first broadcasting channel with highest reception quality in a second location; and
    transmitting information on the first frequency and the second frequency to a first vehicle,
    wherein the first vehicle is a vehicle having a history of receiving the first broadcasting channel, a vehicle currently receiving the first broadcasting channel, or a vehicle in which the first broadcasting channel is registered as a favorite broadcasting channel, and
    wherein the transmitting of the information on the first frequency and the second frequency to the first vehicle comprises:
        receiving destination information from the first vehicle;
        setting a route of the first vehicle based on the destination information, wherein the first location and the second location are two different locations on the set route;
        determining a change section in which a location of the first vehicle is changed from the first location to the second location on the set route; and
        transmitting information on the set route and information on the change section to the first vehicle,
    wherein the collecting of the vehicle data comprises:
        receiving a plurality of first reception qualities of the first frequency of the first broadcasting channel determined by the plurality of vehicles in the first location and a plurality of second reception qualities of the second frequency of the second broadcasting channel in the second location;
        accumulating and averaging the plurality of first reception qualities of the first frequency of the first broadcasting channel for a preset period; and
        accumulating and averaging the plurality of second reception qualities of the second frequency of the second broadcasting channel for the preset period, and
    wherein the determining of the first frequency and the second frequency comprises:
        determining the first frequency based on the accumulated and averaged first reception qualities of the first frequency of the first broadcasting channel; and
        determining the second frequency based on the accumulated and averaged second reception qualities of the second frequency of the second broadcasting channel.

2. The method of claim 1, wherein
the information related to the broadcasting function comprises broadcasting channel information, frequency information, and reception quality information.

3. The method of claim 1, wherein
the location information comprises latitude information and longitude information.

4. The method of claim 1, wherein
the information on the change section comprises location information of the change section and the information on the second frequency.

5. The method of claim 1, further comprising
automatically changing, by the first vehicle, a frequency of a broadcast receiver of the first vehicle based on the information on the first frequency and the second frequency.

6. The method of claim 5, wherein
the automatically changing of the frequency of the broadcast receiver of the first vehicle comprises:
    changing the frequency of the broadcast receiver to the first frequency when the first vehicle drives in the first location; and
    changing the frequency of the broadcast receiver to the second frequency when the first vehicle drives in the second location.

7. A system for providing a broadcast signal frequency, comprising:
    a communicator configured to receive vehicle data including location information and information related to a broadcasting function from a plurality of vehicles;
    a storage device configured to store the vehicle data; and
    at least one processor configured to determine, based on the vehicle data, a first frequency for receiving a first broadcasting channel with highest reception quality in a first location and a second frequency for receiving the first broadcasting channel with highest reception quality in a second location and to control the communicator to transmit information on the first frequency and the second frequency to a first vehicle, wherein the first vehicle is a vehicle having a history of receiving the first broadcasting channel, a vehicle currently receiving the first broadcasting channel, or a vehicle in which the first broadcasting channel is registered as a favorite broadcasting channel, wherein the at least one processor is further configured to:
receive destination information from the first vehicle through the communicator,
set a route based on the destination information, wherein the first location and the second location are two different locations on the set route,
determine a change section in which a location of the first vehicle is changed from the first location to the second location on the set route, and
control the communicator to transmit information on the set route and information on the change section to the first vehicle, and wherein the at least one processor is further configured to:
receive a plurality of first reception qualities of the first frequency of the first broadcasting channel determined by the plurality of vehicles in the first location and a plurality of second reception qualities of the second frequency of the second broadcasting channel in the second location,
accumulate and average the plurality of first reception qualities of the first frequency of the first broadcasting channel for a preset period,
accumulate and average the plurality of second reception qualities of the second frequency of the second broadcasting channel for the preset period,
determine the first frequency based on the accumulated and averaged first reception qualities of the first frequency of the first broadcasting channel, and
determine the second frequency based on the accumulated and averaged second reception qualities of the second frequency of the second broadcasting channel.

8. The system of claim 7, wherein
the information related to the broadcasting function comprises broadcasting channel information, frequency information, and reception quality information.

9. The system of claim 7, wherein
the location information comprises latitude information and longitude information.

10. The system of claim 7, wherein
the information on the change section comprises location information of the change section and the information on the second frequency.

11. The system of claim 7, wherein
the at least one processor is further configured to control the communicator to transmit a control command for changing a frequency of a broadcast receiver of the first vehicle in the change section to the first vehicle.

12. The system of claim 7, wherein
the at least one processor is further configured to:
control the communicator to transmit the information on the first frequency to the first vehicle in response to the first vehicle being driven in the first location; and
control the communicator to transmit the information on the second frequency to the first vehicle in response to the first vehicle being driven in the second location.

* * * * *